United States Patent [19]
Whitney

[11] Patent Number: 5,540,471
[45] Date of Patent: Jul. 30, 1996

[54] HAND TOOL FOR HANDLING SHEET MATERIAL

[76] Inventor: John H. Whitney, 23 Rutherford Ct., Totowa, N.J. 07512

[21] Appl. No.: 450,408

[22] Filed: May 25, 1995

[51] Int. Cl.⁶ .............................. B65G 7/12; B66F 11/00
[52] U.S. Cl. ............................................... 294/15; 294/26
[58] Field of Search ........................... 294/15, 17, 19.1, 294/26, 32, 137

[56] References Cited

U.S. PATENT DOCUMENTS

| D. 255,317 | 6/1980 | Slinkard | 294/26 |
|---|---|---|---|
| 2,610,884 | 9/1952 | Enderle et al. | 294/15 |
| 3,203,606 | 8/1965 | Masterson, Jr. | 294/15 |
| 3,574,380 | 4/1971 | Tague | 294/26 |
| 4,177,911 | 12/1979 | Griffin | 294/15 |
| 4,190,278 | 2/1980 | Jancik, Jr. | 294/15 |
| 4,463,977 | 8/1984 | Wyatt | 294/26 |
| 4,955,647 | 9/1990 | Alfredson | 294/26 |
| 5,257,843 | 11/1993 | Nunn | 294/15 |

FOREIGN PATENT DOCUMENTS

| 1200132 | 7/1970 | United Kingdom | 294/15 |
|---|---|---|---|
| 2171352 | 8/1986 | United Kingdom | 294/15 |

*Primary Examiner*—Dean Kramer
*Attorney, Agent, or Firm*—Siegmar Silber

[57] ABSTRACT

A hand tool is disclosed for use in carrying a panel, such as a drywall or sheetrock workpiece. The hand tool has an elongated body formed from a wire formative and includes a handle portion, a shank portion and a weight-bearing or foot portion. The handle portion is canted inwardly toward a user and upwardly to the rear of the user. The upward canting of the handle portion fits in the closed hand of the user. The handle portion is configured, when held with the wrist unflexed, in the clenched hand of the user with his arm alongside his body, to depend downwardly from between the user's thumb and first finger substantially in alignment with and as extension of the arm of the user. A shank portion of predetermined length is attached at one end to the handle portion. The weight-bearing portion is attached to the shank portion and, when held in an operative position by the user, supports the workpiece along the bearing edge at the balance point. The tool as the workpiece is moved over various gradients is readily movable to another balance point along the bearing edge.

19 Claims, 4 Drawing Sheets

HAND TOOL FOR HANDLING SHEET MATERIAL

BACKGROUND OF THE INVENTION

1. Field of the Invention

This invention relates to a sheet material handling device, and, more particularly, to a hand tool constructed from a wire formative which is ergonomically designed to facilitate sheet material handling. The hand tool is used for carrying sheet-like construction material, such as wallboard, panelling, or sheetrock, along a pathway to an application site. The tool relies for effectivity upon utilization of various lifting techniques, described hereinbelow, and enables a user to employ mechanical advantage at the balance point of the workpiece.

2. Description of the Prior Art

In preparing for this application, several patents became known to the inventor hereof in two distinct groups. The patents in the first group are the following:

| U.S. Pat. No. | Inventor | Orig. Cl. | Date |
| --- | --- | --- | --- |
| 3,203,606 | Masterson | 224/45 | 08/31/65 |
| 4,098,442 | Moore | 224/45 | 07/04/78 |
| 4,135,655 | Brown | 224/45 | 01/23/79 |
| 4,177,911 | Griffin | 224/45 | 12/11/79 |
| 5,069,495 | Mears | 294/15 | 12/03/91 |

The Masterson '606 patent discloses an under-the-arm carrier with a flat, foot-like arrangement with a cam flange to aid in the release from the carrying position.

The Moore '442 patent discloses an under-the-arm carrier with a ledge-like projection on which to rest the panel-being-carried. The Brown '655 patent discloses an under-the-arm carrier with clamping jaws that affix about the centerline of the panel and is held there under spring tension.

The Griffin '911 patent discloses an under-the-arm carrier with spaced apart legs; however, the carrier does not provide for adjustability with shift in center of gravity.

The Mears '495 patent teaches an outboard carrier with complex foot arrangement and a holding mechanism; however, the carrier does not provide for adjustability with shift in center of gravity. Upon continuing to seek patents relating to the invention at hand, the following patents became known to the inventor hereof:

| ITEM NO. | U.S. Pat. No. | INVENTOR | ISSUE DATE |
| --- | --- | --- | --- |
| 1 | D. 222,901 | Meadows | 02/01/72 |
| 2 | D. 255,317 | Slinkard | 06/10/80 |
| 3 | D. 286,972 | Crews | 12/02/86 |
| 4 | D. 302,234 | McNamee et al. | 07/18/89 |
| 5 | 1,985,571 | Hetzel | 12/25/34 |
| 6 | 2,428,941 | Packard | 10/14/47 |
| 7 | 2,340,142 | Roberts | 11/04/47 |
| 8 | 2,673,114 | Davis | 03/23/54 |
| 9 | 4,113,160 | Spiers | 09/12/78 |
| 10 | 4,190,278 | Jancik, Jr. | 02/26/80 |
| 11 | 4,245,763 | Weinberg | 01/20/81 |
| 12 | 4,695,085 | Cassels | 09/22/87 |
| 13 | 5,127,693 | Pruit | 07/07/92 |
| 14 | 5,257,843 | Nunn | 11/02/93 |

None of the patents disclosed either separately or in combination show the device of the invention. The disclosure solves the technical problem of maneuverability and ease of handling of panels.

The submission of the above list of documents is not intended as an admission that any such document constitutes prior art against the claims of the present application. Applicant does not waive any right to take any action that would be appropriate to antedate or otherwise remove any listed document as a competent reference against the claims of the present application.

SUMMARY

In general terms, the invention disclosed hereby includes a hand tool for transporting a panel-to-be-carried or work-piece along a pathway to an application site. The work-piece has a facial plane, a bearing edge, and a point of balance within said edge. The hand tool has an elongated body formed from a wire formative and includes a handle portion, a shank portion and a weight-bearing or foot portion. The handle portion is canted inwardly toward a user and upwardly to the rear of the user. A shank portion of predetermined length is attached at one end to the handle portion. The weight-bearing portion is attached to the shank portion and, when held in an operative position by the user, is adapted to support the work-piece along the bearing edge and is adapted to be positionable to the balance point therealong.

OBJECT AND FEATURES OF THE INVENTION

It is an object of the present invention to provide a hand tool which is simple in design and construction and is useful for handling sheetlike construction materials.

It is a further object of the present invention to provide a hand tool that supports a panel of construction material along the bearing edge and at the balance point thereof.

It is yet another object of the present invention to provide a hand tool for carrying sheet material along a pathway to the application site thereof with the sheet material held at a defined angle to the pathway.

It is still yet another object of the present invention to provide a hand tool operating in a tool plane normal to the sheet material.

It is a feature of the present invention that the hand tool extends the user's reach to accommodate the sheet material alongside the body in an outboard position.

It is another feature of the present invention to have a single support point device which facilitates control of the sheet material during carriage.

It is yet another feature of the present invention to adapt the weight-bearing portion of the tool for specific material handling applications.

Other objects and features of the invention will become apparent upon review of the drawings and the detailed description which follow.

BRIEF DESCRIPTION OF THE DRAWINGS

In the following drawings, the same parts in the various views are afforded the same reference designators.

DESCRIPTION OF THE PREFERRED EMBODIMENT

Figure 1:
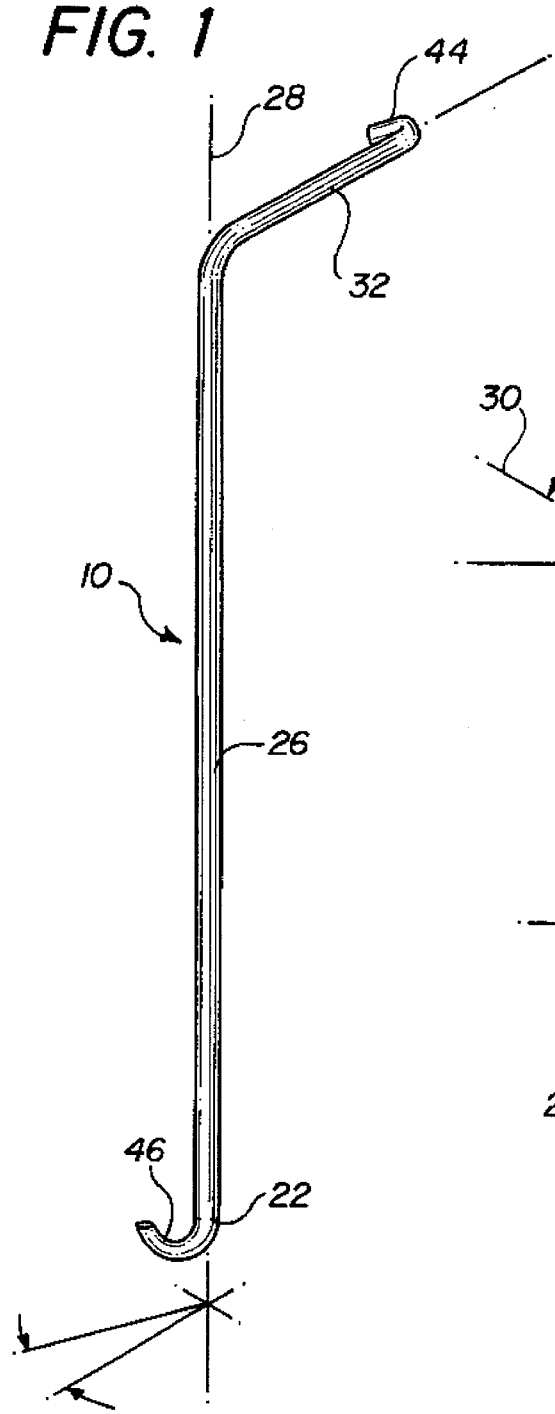
FIG. 1 is an overall perspective view of the panel-carrying hand tool of the present invention.

Referring now to FIGS. 1 through 5 a hand tool for handling sheet material is shown and is referred to generally by reference numeral 10. In FIG. 1, the hand tool 10 is shown in relation to a workpiece or panel-to-be-carried 12. In the specification which follows the term "panel" is defined as a sheetlike body of material, for example, a 4-foot by 8-foot sheet of plywood, of wallboard or of a decoratively finished sheet of wood or composite material, and such material customarily used in construction or renovation. The workpiece 12 includes a facial plane 14 which extends to the edges of the panel and at least one of which the bearing edge 16 is parallel to and adjacent the ground path 18 of the panel 12. Along the bearing edge is a point of balance 20 suitable for tool application. The hand tool 10 is a wire formative and, in the example shown, is constructed from a formative that is circular in cross-section. In the illustration a portion of panel 12 is broken away to show the foot or weight-bearing portion 22 of the hand tool 10. The foot portion 22 has as longitudinal axis 24 therethrough. Rising from the foot portion 22 and contiguous therewith is a shank protion 26 with a longitudinal axis 28. When the hand tool 10 is held in an operative position, as defined hereinbelow, the longitudinal axis 24 of foot portion 22 and the longitudinal axis 28 of shank position 26 lie in a tool plane 30 which is substantially normal to facial plane 14. At the end of the shank portion 26 opposite the weight-bearing portion 22, a handle portion 32 is constructed and attached thereto, which, when held in an operative position, is constructed to be canted inwardly toward the user and upwardly toward the rear of the user.

Figure 2:
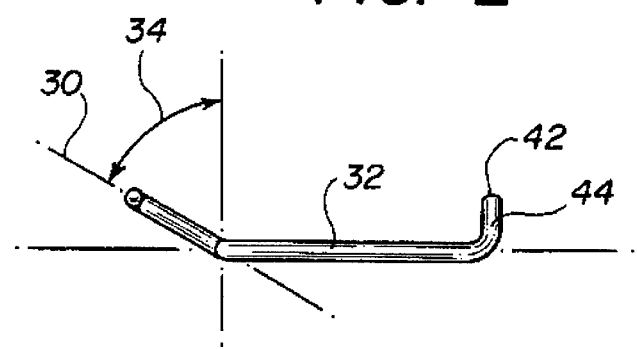
FIG. 2 is a top plan view showing the relationship between the handle portion and the weight-bearing portion of the hand tool.
Figure 3:
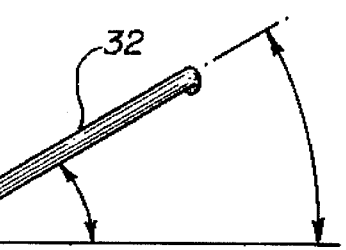
FIG. 3 is an elevational view of the device showing the relationship between the handle portion and the shank portion of the hand tool.
Figure 4:
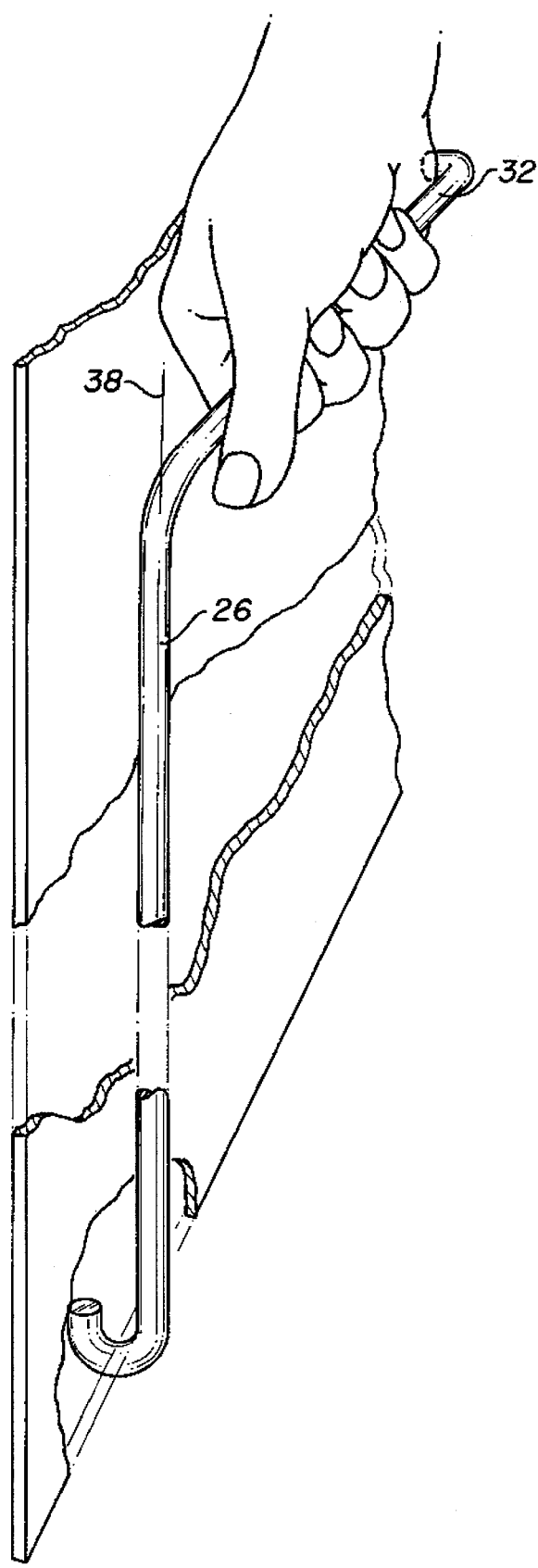
FIG. 4 is a perspective view showing the device of the invention in relation to the hand of the user and the panel being carried in relation to the hand of the user.
Figure 5A:
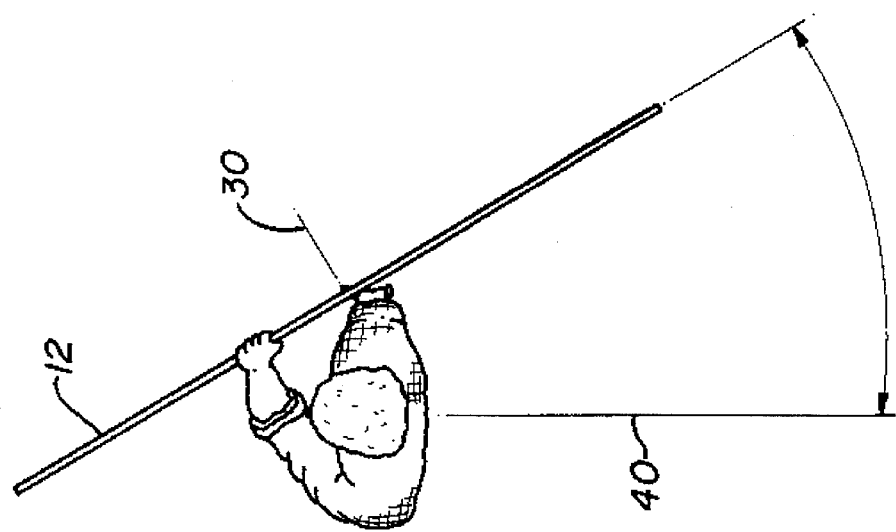
FIG. 5A is a top plan view of FIG. 5.
Figure 5:
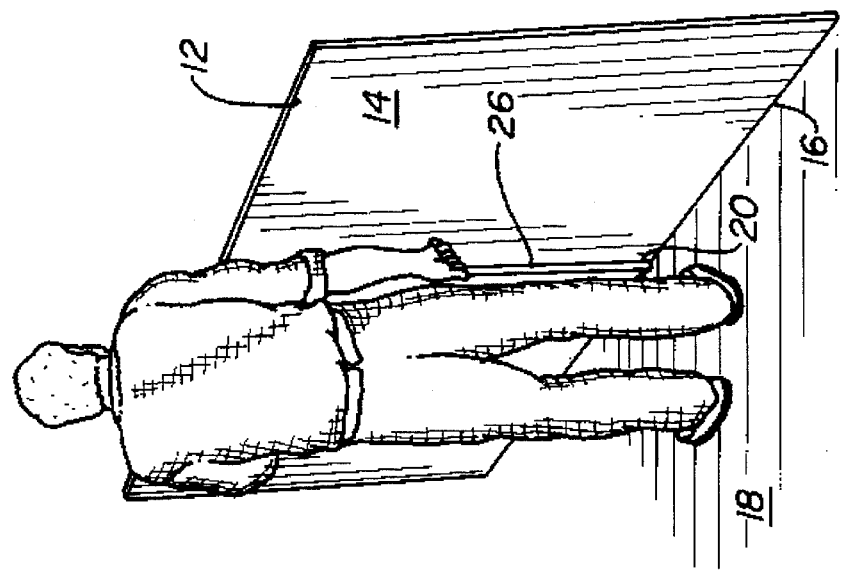
FIG. 5 is a perspective view showing the single point, balanced lifting technique employed using the tool of the invention to carry a panel along a pathway to an application site.
Figure 6:
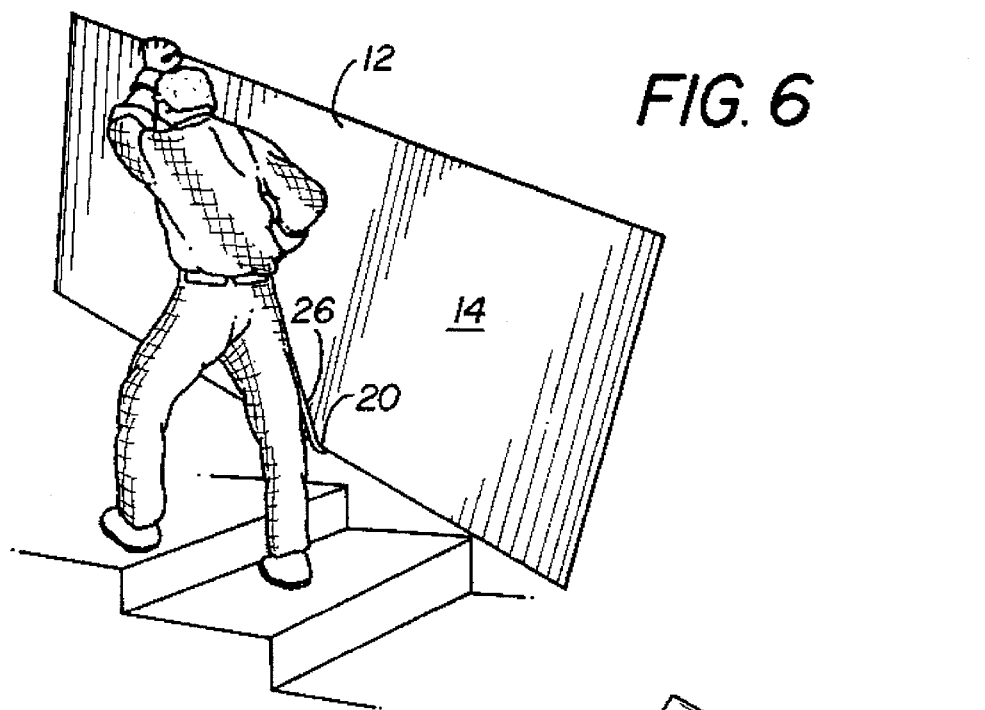
FIG. 6 is a perspective view showing the single point, balanced lifting technique employed using the tool of the invention to carry a panel up a stairway to an application site; and, FIG. 6A is a top plan view of FIG. 6.
Figure 6A:
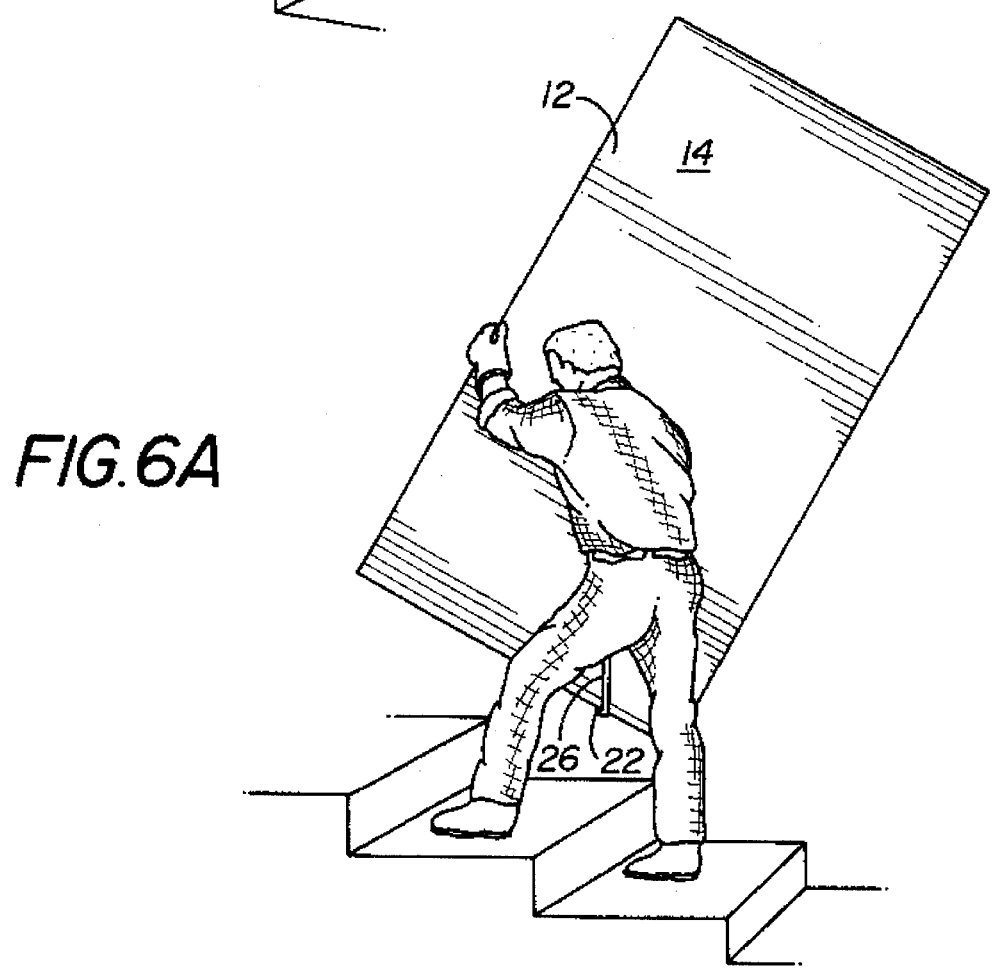

Turning now to FIGS. 2,3, and 4 a detailed perspective shows the handle portion 32. For purposes of this discussion and that of the operating section which follows, the term "operative position" is now defined. The operative position of the panel carrying hand tool of this invention is with the upper and lower arm fully extended alongside the body; the hand formed into a fist, with the handle portion enclosed therewithin; the shank portion extending downwardly from between the thumb and index finger, substantially vertically, to within a few inches above the ground; the weight-bearing portion facing outward so that, with a panel thereon, the panel would be held at an angle to the path of carriage and outward of and adjacent to the user's arm. The handle portion 32 is constructed to provide clearance for the user's hand between the wire formative body of the hand tool 10 and the facial plane 14 of the workpiece 12. To accomplish this, the top plan handle angle 34, when viewed in the operative position and from above, is approximately 60 degrees from the tool plane 30 and 30 degrees from the workpiece facial plane 14; and similarly, the side elevational handle angle 36 is approximately 15° from horizontal. The tool 10 is constucted to have the longitudinal axis 38 therof to be approximately parallel to the plane of carriage 40. With the hand tool 10 constructed in this manner, the tool depends as an arm extension without any pronation or supination of the musculature. At the distal end 42 of the handle protion 32, a stop 44 is constructed from the wire formative.

Referring to FIGS. 3 and 4, the weight-bearing or foot portion 22 is now shown in detail. The foot portion 22 is constructed to be adjustably positionable along the bearing edge 16 and, as the point of balance 20 shifts, the foot portion 22 is appropriately emplaced. This adjustability is enhanced by the structure having a single support point 46 so that, when in the operative position, the bearing edge 16 is tangential to the circular cross section previously described. The adjustability is also enhanced by the contour 48 being configured to accommodate that of the bearing edge of workpiece 12.

The panel carrying tool is now described with reference to FIGS. 5, 5A, 6 and 6A with particular attention now being drawn to the operation thereof. It is noted that the device is utilized so that the panel is carried outboard by the user with the panel at a balance point, or on a center of gravity line. Then, as for example when the panel is being carried up a slight grade, the tool can be readily adjusted to accommodate the new center of gravity by sliding the foot portion rearwardly until balance is achieved.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A hand tool to aid a user in transporting a panel along a pathway to an application site, said panel having a facial plane, a bearing edge, and a point of balance within said edge, said hand tool having an elongated body formed from a wire formative comprising:

a handle portion at one end of said formative, said handle portion canting inwardly toward a user and upwardly to the rear of the user, said upwardly canting of said handle portion fitting in the closed hand of the user and said handle portion configured, when held, with the wrist unflexed, by the clenched hand of the user with his arm alongside his body, to depend downwardly from between the user's thumb and first finger substantially in alignment with and as extension of the arm of the user;

a shank portion of predetermined length attached at one end thereof to said handle portion; and, a weight-bearing portion attached to said shank portion at the end opposite said handle portion, and, when held in an operative position by the user, supporting the panel along said bearing edge at the balance point therealong;

said weight-bearing portion and said shank portion have longitudinal axes therethrough forming a tool plane which, when the tool is in an operative position, is substantially normal to said facial plane;

said inwardly canting of said handle portion enabling the closed hand of the user to clear, during operation, said facial plane of said panel supported by the weight-bearing portion.

2. A hand tool as described in claim 1 wherein said wire formative is circular in cross-section and, when held in the operative position, said bearing edge is tangential thereto.

3. A hand tool as described in claim 2 wherein said handle portion, when viewed in the operative position, is at an approximately 30-degree angle to said facial plane.

4. A hand tool as described in claim 3 wherein said handle portion is adapted to hold said weight bearing portion approximately at or slightly above the ankle-level of the user.

5. A hand tool as described in claim 1 wherein said body, when held in an operative position, is adapted to depend substantially vertically from a hand of a user as an extension of his arm.

6. A hand tool as described in claim 5 wherein said body, when held in an operative position, is adapted to hold said panel substantially vertical with the facial plane thereof at an approximately 30-degree angle to said pathway.

7. A hand tool for aiding the carriage of a large, flat workpiece of construction material along a pathway to an application site, said workpiece having a facial plane, a bearing edge, and a point of balance within said edge, said hand tool having an elongated body formed from a wire member comprising:

a foot portion at one end of said member adapted, when the hand tool is held in an operative position by a user, to support the workpiece along said bearing edge and adapted to be adjustably positionable at said point of balance therealong, said foot portion having a longitudinal axis therethrough;

a shank portion of predetermined length attached at one end thereof to said foot portion, said shank portion having a longitudinal axis lying in a tool plane with the longitudinal axis of said foot portion, said tool plane, upon the tool being placed in an operative position, being substantially normal to said facial plane;

a handle portion attached to said shank portion at the end opposite said foot portion, said handle portion, when viewed in the operative position, canted inwardly toward the user and upwardly to the rear of the user and adapted to hold said foot portion approximately at or slightly above the ankle-level of the user.

8. A hand tool as described in claim 7 wherein said wire member is circular in cross-section and, when held in the operative position, said bearing edge is tangential thereto.

9. A hand tool as described in claim 8 wherein said handle portion, when viewed in the operative position, is at an approximately 30-degree angle to said facial plane of said workpiece.

10. A hand tool as described in claim 8 wherein said handle portion has a longitudinal axis, which, when viewed in the operative position, is parallel to a vertical plane through said pathway.

11. A hand tool as described in claim 8 wherein said handle portion further includes a stop means for preventing slippage during handling, said stop means attached at the end of said handle portion opposite said shank portion.

12. A hand tool as described in claim 7 wherein said body, when held in an operative position, is adapted to depend substantially vertically from a hand of a user as an extension of his arm.

13. A hand tool as described in claim 12 wherein said body, when held in an operative position, is adapted to hold said workpiece substantially vertical with the facial plane thereof at an approximately 30-degree angle to said pathway.

14. A hand tool as described in claim 7 wherein said foot portion is configured to the contour of workpiece bearing edge.

15. A hand tool for aiding the carriage of a wallboard or other piece of construction material along a substantially vertical pathway to an application site, said workpiece having a facial plane, a bearing edge, and a point of balance within said edge, said hand tool comprising:

an elongated body formed from a wire member, said body, when held in an operative position, adapted to depend substantially vertically from a hand of a user as an extension of his arm and adapted to hold said workpiece substantially vertical with the facial plane thereof at an angle to the vertical pathway, said wire member, in turn, comprising:

a weight-bearing portion at one end of said member adapted, when the hand tool is held in an operative position by a user, to support the workpiece along said bearing edge and adapted to be positionable at said point of balance therealong, said weight-bearing portion having a longitudinal axis therethrough;

a shank portion of predetermined length attached at one end thereof to said weight-bearing portion, said shank portion having a longitudinal axis lying in a tool plane with the longitudinal axis of said weight-bearing portion, said tool plane, upon the tool being placed in an operative position, being substantially normal to said facial plane;

a handle portion attached to said shank portion at the end opposite said weight-bearing portion and, when viewed in the operative position, canted inwardly toward the user and upwardly to the rear of the user.

16. A hand tool as described in claim 15 wherein said wire member is circular in cross-section and, when held in the operative position, said bearing edge is tangential thereto.

17. A hand tool as described in claim 15 wherein said handle portion, when viewed in the operative position, is at an approximately 30-degree angle to said facial plane.

18. A hand tool as described in claim 15 wherein, with said tool held in an operative position, said angle between said facial plane and said pathway is approximately 30 degrees.

19. A hand tool as described in claim 15 wherein said handle portion has a longitudinal axis, which, when viewed in the operative position, is parallel to said vertical pathway.

* * * * *